United States Patent [19]

Mizutani et al.

[11] 4,285,890
[45] Aug. 25, 1981

[54] METHOD FOR MANUFACTURING SILICONE CONTACT LENSES

[75] Inventors: Yutaka Mizutani, Nagoya; Yoshiharu Miwa, Gifu; Mitsuru Oshima, Obu, all of Japan

[73] Assignee: Nippon Contact Lens Manufacturing Ltd., Nagoya, Japan

[21] Appl. No.: 949,475

[22] Filed: Oct. 10, 1978

Related U.S. Application Data

[62] Division of Ser. No. 808,857, Jun. 22, 1977, Pat. No. 4,138,086.

[30] Foreign Application Priority Data

Apr. 28, 1977 [JP] Japan ................................. 52/48397

[51] Int. Cl.³ ............................................. B29D 11/00
[52] U.S. Cl. ..................................... 264/1.1; 264/338
[58] Field of Search ....................... 264/1, 2, 337, 338; 425/808; 249/114, 116, 135

[56] References Cited

U.S. PATENT DOCUMENTS

| 3,811,647 | 5/1974 | Pink ..................................... 425/808 |
| 3,915,609 | 10/1975 | Robinson ................................ 264/1 |
| 4,208,364 | 6/1980 | Shepherd ................................ 264/1 |

FOREIGN PATENT DOCUMENTS

| 2356911 | 5/1975 | Fed. Rep. of Germany ............. 264/1 |
| 45-13720 | 5/1970 | Japan ........................................ 264/1 |

Primary Examiner—James B. Lowe
Attorney, Agent, or Firm—Jordan and Hamburg

[57] ABSTRACT

A method for manufacturing silicone lenses by use of a mold of specific structure is provided. The mold comprises a male section and a female section each of which has a mold surface plated with chromium, hard chromium or nickel. Both sections when joined together come into line contact with each other to define a mold cavity therebetween. With this type of mold, the method of the present invention is carried out in such a manner that a silicone resin material is cast into the mold cavity and the mold is heated in hot water until the material is cured. The cured material makes itself a finished contact lens of excellent quality.

1 Claim, 4 Drawing Figures

METHOD FOR MANUFACTURING SILICONE CONTACT LENSES

This is a division of application Ser. No. 808,857, filed June 22, 1977, now U.S. Pat. No. 4,738,086, issued Feb. 2, 1979.

FIELD OF INVENTION

The present invention relates to a method for manufacturing silicone contact lenses by the use of a mold of the type comprising a pair of mold halves which when joined together form a cavity therebetween into which is cast a flowable contact lens material.

DESCRIPTION OF THE PRIOR ART

The conventional contact lens has been manufactured in such a manner that a roughly shaped contact lens of a comparatively hard material such as polymethacrylate is cut and ground to a finished lens and, therefore, no mold has been needed for its manufacture. Further, it has been considered difficult to use a mold for lens manufacturing purposes since the polymethacrylate contracts to a great degree when it is molded. For these and other reasons, no satisfactory mold has ever been developed in the field of contact lens manufacture. However, it has been found of late that the so called hard contact lens which is made of hard material like polymethacrylate has such drawbacks that when in use it irritates the eye of a patient and moreover, due to its poor oxygen permeability, the continual use thereof is almost impossible. To overcome these disadvantages, a contact lens of a silicone resin which is rich in flexibility and excellent in oxygen permeability has been proposed. However, the lens of this type is too soft to cut or grind in its hard refrigerated state in vain because it again becomes soft due to a rise in temperature as a result of friction during processing. Further, the characteristics of the silicone resin vary between a state in which it is hard and a state in which it is soft, so that it has not been possible to manufacture from this material a wearable contact lens to a patient's satisfaction. Although the U.S. Patents issued to H. D. Crandon U.S. Pat. No. 3,221,083, issued Nov. 20, 1965 and C. C. Robinson U.S. Pat. No. 3,915,609, issued Oct. 28, 1975, respectively, disclose molds of the type similar to that of the present invention, these molds can not more or less escape the above mentioned disadvantages in that the mold of Crandon's patent is apparently so simply formed that a contact lens produced thereby must be subjected to further steps of processing such as cutting and grinding while Robinson's patent, which shows some improvements over the former, is rather directed to a mold construction suitable for radiation of a high energy electron beam.

The present invention has been made to overcome the above mentioned disadvantages of the conventional contact lens and to provide a method for manufacturing a silicone contact lens of excellent quality in its final and finished form in a simple manner.

SUMMARY OF THE INVENTION

The method according to the present invention involves a pair of metallic mold halves, a male section and a female section. The male section has on its upper side a convex mold surface for forming the posterior surface of a lens and a peripheral portion in the shape of a tapered protrusion with a sharp edge extending above the edge of the convex mold surface and the female section has on its lower side a concave mold surface for forming the anterior surface of the lens and a flat peripheral portion surrounding the former.

With such an arrangement, one of the important features of the present invention resides in that both male and female sections of the mold can be joined together such that the tapered edge of the peripheral portion of the former comes into contact with the edge of the concave mold surface of the latter in a line or edge-to-edge fashion to thereby provide a mold cavity therebetween so that the surface and the edge of the contact lens produced thereby can be prevented from becoming irregularly or ruggedly formed as was often the case with the conventional contact lens and, therefore, a finished contact lens per se can be manufactured without further steps of cutting and grinding.

Another important feature of the present invention resides in that the mold surface of each section of the mold is plated with chromium or nickel so that a contact lens having high surface optical quality can be manufactured, especially with the use of a silicone resin as a material therefor which has a strong affinity for chromium and nickel.

Accordingly, an object of the present invention is to provide a method for manufacturing contact lenses in their final form without applying further steps of processing thereon such as cutting and grinding.

Another object of the present invention is to provide a method whereby a mold of the above character can be manufactured in a simple manner and at low cost and which can be used semi-permanently.

BRIEF DESCRIPTION OF THE DRAWING

The present invention will now be explained in detail by way of example with reference to the accompanying drawing in which.

DETAILED DESCRIPTION OF THE INVENTION

Figure 1:
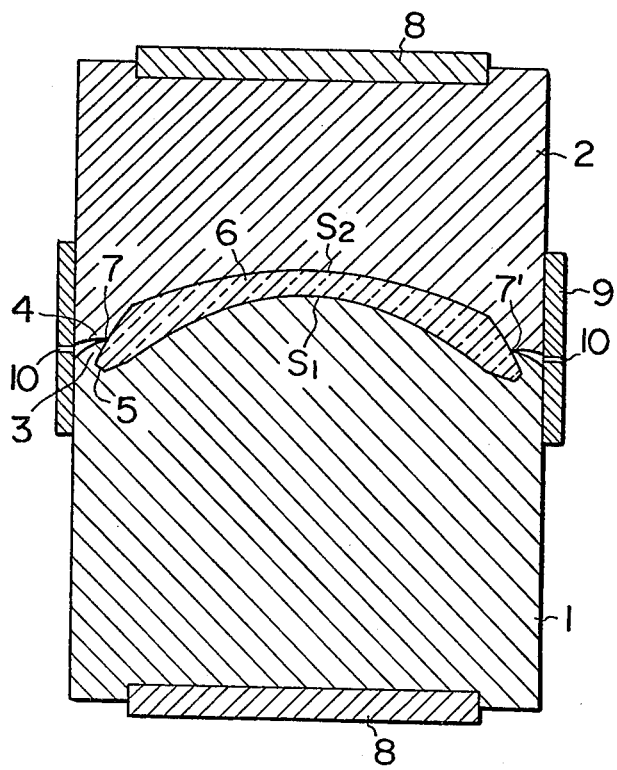
FIG. 1 is a vertical sectional view of a mold for manufacturing silicone contact lenses according to the present invention.

As shown in FIG. 1, a preferred embodiment of the method according to the present invention involves the use of a pair of mold halves, that is, a male section 1 and a female section 2 both of which are made of a metallic material preferably of brass. Further, the male section 1 is provided on its upper side with a central convex mold surface $S_1$ for forming the posterior surface of a lens 6 and a peripheral portion 3 in the shape of a tapered protrusion with a sharp edge extending above the entire edge of the surface $S_1$. As will be clear from the drawing, the internal surface of the peripheral portion 3, which is continuous with the surface $S_1$, constitutes itself a mold surface for forming in part the anterior surface of the lens 6 when both sections 1 and 2 are joined together. On the contrary, the female section 2 is provided on its lower side a central concave mold surface $S_2$ for forming the anterior surface of the lens 6 in cooperation with the peripheral portion 3 of the male section 1, and a curved peripheral portion 4 surrounding the former. Further, the surfaces $S_1$ and $S_2$ with the inclusion of the internal surface of the peripheral portion 3 of the section 1 are plated with chromium, preferably hard chromium or nickel because the silicone resin material to be cast into the mold cavity has a strong affinity for these metals and the optical quality of the lens is greatly improved as will hereinafter be explained with reference to a comparison table in which the results of use of various metals are shown by way of comparison.

Figure 3:
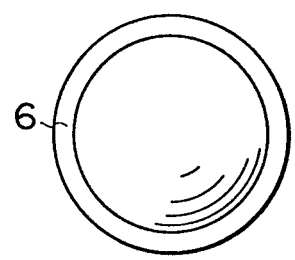
FIG. 3(a) is a plane view of a contact lens manufactured by use of the method according to the present invention and using the mold as shown in FIG. 1.
FIG. 3(b) is a plane view of a contact lens manufactured by use of the conventional mold as shown in FIG. 2.
Figure 2:
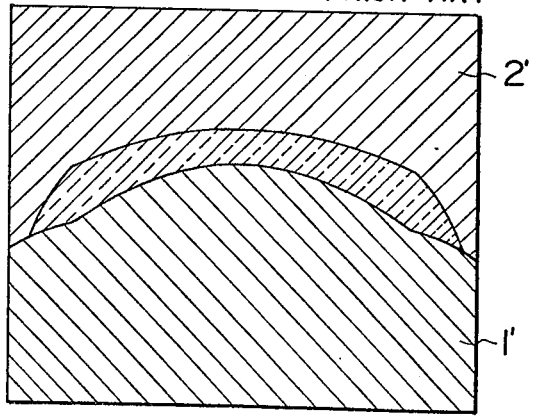
FIG. 2 is a vertical sectional view of a conventional mold for manufacturing contact lenses.
Figure 3:
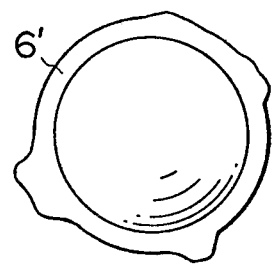

With the above arrangement, when both sections 1 and 2 are joined together, the edge of the peripheral portion 3 of the former comes into contact with the edge of the surface $S_2$ of the latter as at 7 and/or 7' not in a flat-to-flat fashion as shown in FIG. 2 (which illustrates a typical conventional mold construction) but in a line or edge-to-edge fashion as shown in FIG. 1. This manner of contact has a particular advantage in that a melting lens material flowing outside the mold through a fine gap between the opposing contact surfaces of both sections is cut easily and cleanly without forming any flash extending outside the mold cavity from the lens edge since the contact area between both sections is kept at minimum, and with a mold of such structure only, the steps of cutting and grinding for the lens can be dispensed with. For example, FIG. 3(a) shows an example of a lens manufactured by the mold according to the present invention while FIG. 3(b) shows that of a lens manufactured by the conventional mold as shown in FIG. 2. Further, it will be more preferable in this case that, as shown in FIG. 1, the edge of the mold cavity which corresponds to the edge 5 of the lens is rounded in the male section and the contact portion 7 and/or 7' comes to lie above, and in the vicinity of, the edge of the mold so that the lens edge corresponding thereto can be preformed and the contact lens as well as the mold can be manufactured more easily and simply than otherwise in view of the fact that the contact lens has an extremely minute structure with the radius of curvature at the curved edge 5 being as small as 0.13 mm and the wearing conditions of the lens depending so much on the condition of the finish thereat.

In FIG. 1, a numeral 8 indicates a hard metallic plate half embedded in each of the sections 1 and 2 which plate is provided to prevent the mold from deformation or damage when a mechanical force is applied on the mold to press same. A support 9 provided around the side wall of the mold is adopted for causing the center of the anterior surface of the lens 6 to coincide with that of the posterior surface thereof in a simple manner the failure of which would make the lens useless. A hole 10 formed in the support 9 is adopted for pulling out air from the mold cavity. By the way, as regards the manner of contact between both male and female sections 1 and 2 of the mold according to the present invention should not be construed so strictly as such and, therefore, a slight degree of flatness in their contact should also be considered included in the scope of the present invention provided that no rugged or irregular formation of the lens periphery takes place.

The method for manufacturing silicone contact lenses according to the present invention involves silicone resin material which is first cast into the cavity formed between the male and female sections of the above-described mold and after both sections are tightly joined together, the mold is heated in hot water at a temperature between about 80° C. and 100° C. so that the silicone resin material within the cavity may be cured to become a finished contact lens.

The following Table 1 shows how the efficiency of a contact lens is varied in dependence on the kinds of platings on the surface of a mold from which the contact lens is shaped, especially between the platings of chromium or nickel and other metals.

TABLE 1

| Kinds of Platings | Characteristics of Contact Lens Manufacturing Mold | | | | | | | | | Characteristics of Contact Lens | | |
|---|---|---|---|---|---|---|---|---|---|---|---|---|
| | Conditions of Surface Finish | Easiness of Grinding | Resistance to Shocks due to Falling | Resistance to Damages due to Scratches | Resistance to Friction | Resistance to Heat | Resistance to Corrosion by Organic Solvents | Durability | Ease of Difficulty in Target Test by Gauge | Optical Property of Lens Surface | Separability from Mold Surface | Sharpness at Lens Periphery |
| No Plating | A | | D | D | D | D | D | D | | B | A | A |
| Hard Chromium | B | A | A | A | A | A | A | A | A | A | A | A |
| Nickel | A | B | C | C | A | A | A | B | B | A | A | A |
| Copper | C | D | D | D | C | C | D | D | D | B | A | B |
| Zinc | D | D | D | D | D | B | D | D | D | C | B | B |
| Tin | D | D | D | D | D | D | D | D | D | D | D | D |
| Iron | C | C | C | C | B | B | C | C | B | B | C | C |

Remarks.
The markings A, B, C, and D as given in the above table indicate "best", "fair", "bad", and "worst", respectively.

From the above table 1, it will be seen that a mold plated with hard chromium and a contact lens made of a silicone resin have excellent characteristics and especially the optical property of the surface of the silicone contact lens gives a great effect upon its efficiency and that a silicone contact lens manufactured by a hard chrome or nickel plated mold is excellent since it appears that there is a strong affinity or a favorable relationship between silicone resin and chromium or nickel.

As described above, it will be seen that the method for manufacturing contact lenses according to the present invention will make it possible to manufacture completely finished silicone contact lenses on a large scale and in a simple manner without the necessity of applying any additional steps thereto such as cutting and grinding and has a great industrial merit in that the mold can be manufactured in a simple manner and can be used semipermanently.

What is claimed is:

1. A method of manufacturing silicone contact lenses comprising the steps of: utilizing a metallic mold having a male section with a convex mold surface and a female section with a concave mold surface, said convex and concave mold surfaces being plated with a metal selected from hard chromium and nickel, said convex mold surface having a radial outer concave portion terminating in a first circumscribing edge and said concave mold surface terminating in a radial second circumscribing edge; mating said male and female sections along said first and second circumscribing edges with line contact to thereby provide a mold cavity between said male and female sections; molding a silicone resin material in said mold cavity to form said contact lens, said molding step comprising molding the peripheral edge of said contact lens in said radial outer concave portion so as to prevent the formation of irregularities on the edge of the molded lens; and heating the mold in hot water to a temperature of between 80° C. and 100° C. until the silicone resin material within the mold is cured.

* * * * *